United States Patent Office 2,945,700
Patented July 19, 1960

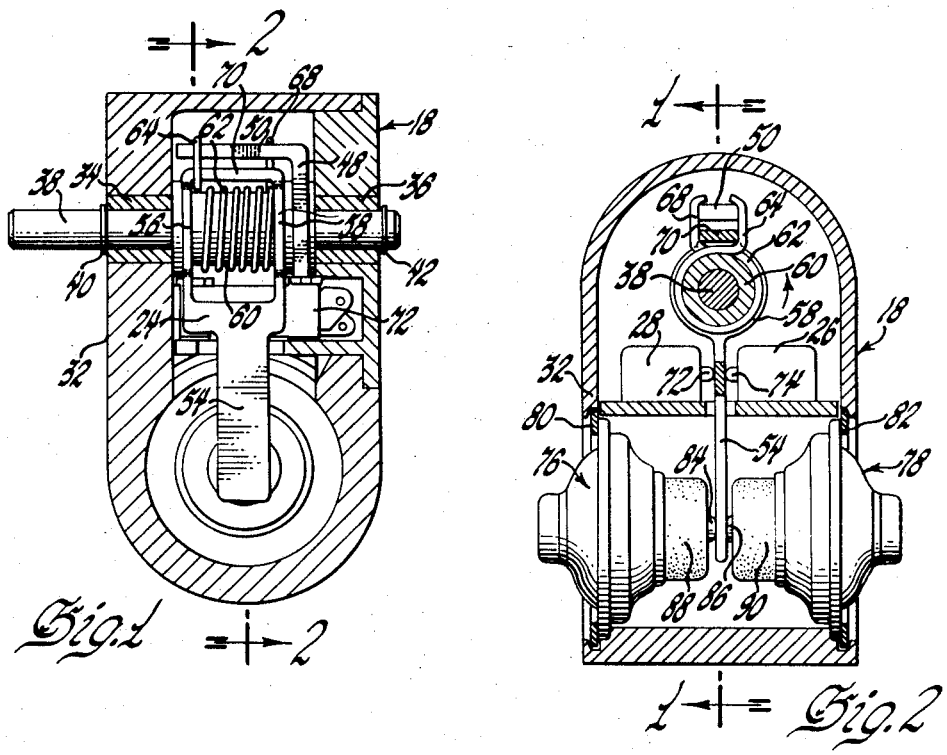
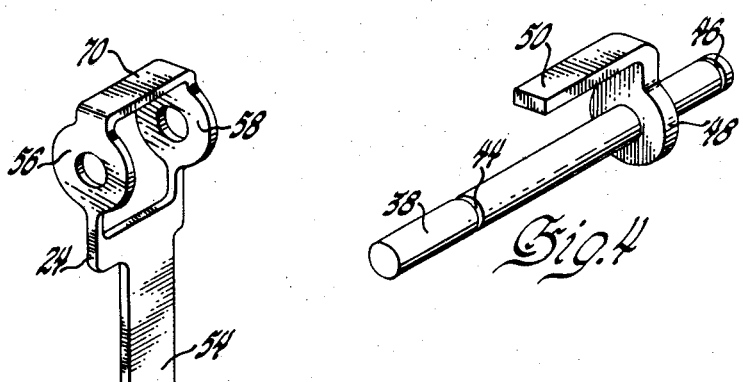

2,945,700

FLUID SUSPENSION HAVING QUICK CENTERING CONTROL FOR ELECTRICALLY ACTUATED VALVES

Von D. Polhemus, Franklin, and William C. McIntyre, Royal Oak, Mich., assignors to General Motors Corporation, Detroit, Mich., a corporation of Delaware Filed Apr. 19, 1957, Ser. No. 653,768

3 Claims. (Cl. 280—124)

This invention relates to control mechanisms and more particularly to control mechanisms associated with fluid suspension for vehicles.

In vehicle suspension utilizing confined air or other fluids as an elastic medium, it is desirable that some form of device be employed to sense displacement between the sprung and unsprung mass in order to control the flow of air into and out of the air confining body and thus compensate for changes in the sprung weight. Such devices are commonly called leveling valves and have taken two general forms in the prior art. One form involves a direct mechanical actuation, as by linkage, of suitable valves in the fluid conducting system so that relative displacement of the sprung and unsprung mass causes opening of the related intake or exhaust passage to the fluid spring. In the other general form, the valves which control the intake and exhaust passages are adapted for electrical operation. These valves may be located at any desired position in the air supply system, being energized by a switch mechanism which, in turn, is actuated by mechanical linkage directly connected to the sprung mass. In both of the forms described above, it has proved desirable to provide means for introducing a time delay or lag so as to prevent instantaneous response of the leveling valve to short duration relative displacement of the sprung and unsprung mass such as occasioned by normal wheel oscillation. In the prior art, it has been customary to provide for such delay by means of piston type dashpots utilizing non-compressible fluids. These devices usually incorporate a restriction calibrated to cause the desired delay in movement of the piston. For a complete description of such a device, reference may be had to U.S. Patent No. 2,670,201 Rossman, assigned to General Motors Corporation. Although such devices have proved satisfactory in the past, practical experience with passenger cars equipped with air suspension has shown that fully damped leveling valves tend to cause overcontrol of movement of the elastic medium, due to the fact that time lag is uniform for all movements of the leveling valve mechanism.

An object of the present invention is to provide a quick centering damped leveling valve.

Another object is to provide a leveling valve structure utilizing pneumatic damping.

A further object is to provide a leveling valve mechanism incorporating a structure for causing delayed response of the mechanism to displacement of the sprung and unsprung mass occasioned by initial deviation of the vehicle from normal trim only, whereby reverse movement to normal trim is accompanied by return of the leveling valve mechanism to its neutral position at a corresponding rate.

Another object is to provide a leveling valve structure having an actuating member movable from a central neutral position to two operating positions at opposite sides of the neutral position including a damping device capable of inducing time lag in the movement of the mechanism from neutral to either open position but permitting instantaneous return to the neutral position from either of the operating positions.

A further object is to provide in a leveling valve control mechanism a pair of opposed dashpots each of which is arranged to resist movement by a valve operating member in one direction only from a predetermined central position.

Yet a further object is to provide a structure of the stated character wherein damping is accomplished by a pair of single action pneumatic dashpots arranged in opposed relation.

Still a further object is to provide a device of the type described wherein coaxially arranged driving and driven members are connected together by a resilient member permitting yieldable relative rotation therebetween whereby the driving member may respond directly to an actuating force while the driven member moves at a different rate determined by the dashpot action.

Yet a further object is to provide a device of the type described wherein the driven member is adapted upon predetermined movement in either direction from a neutral position to energize one or the other of a pair of valve controlling electrical switches.

These and other objects, advantages and features of the invention will become more fully apparent as reference is had to the accompanying specification and drawings wherein:

Fig. 1 is an elevational view, partly in section, showing the form and arrangement of the invention;

Fig. 2 is a view looking in the direction of arrows 2—2 of Fig. 1;

Fig. 3 is a perspective view of a control mechanism driven member;

Fig. 4 is a perspective view of the control mechanism driving member; and

Figure 5:
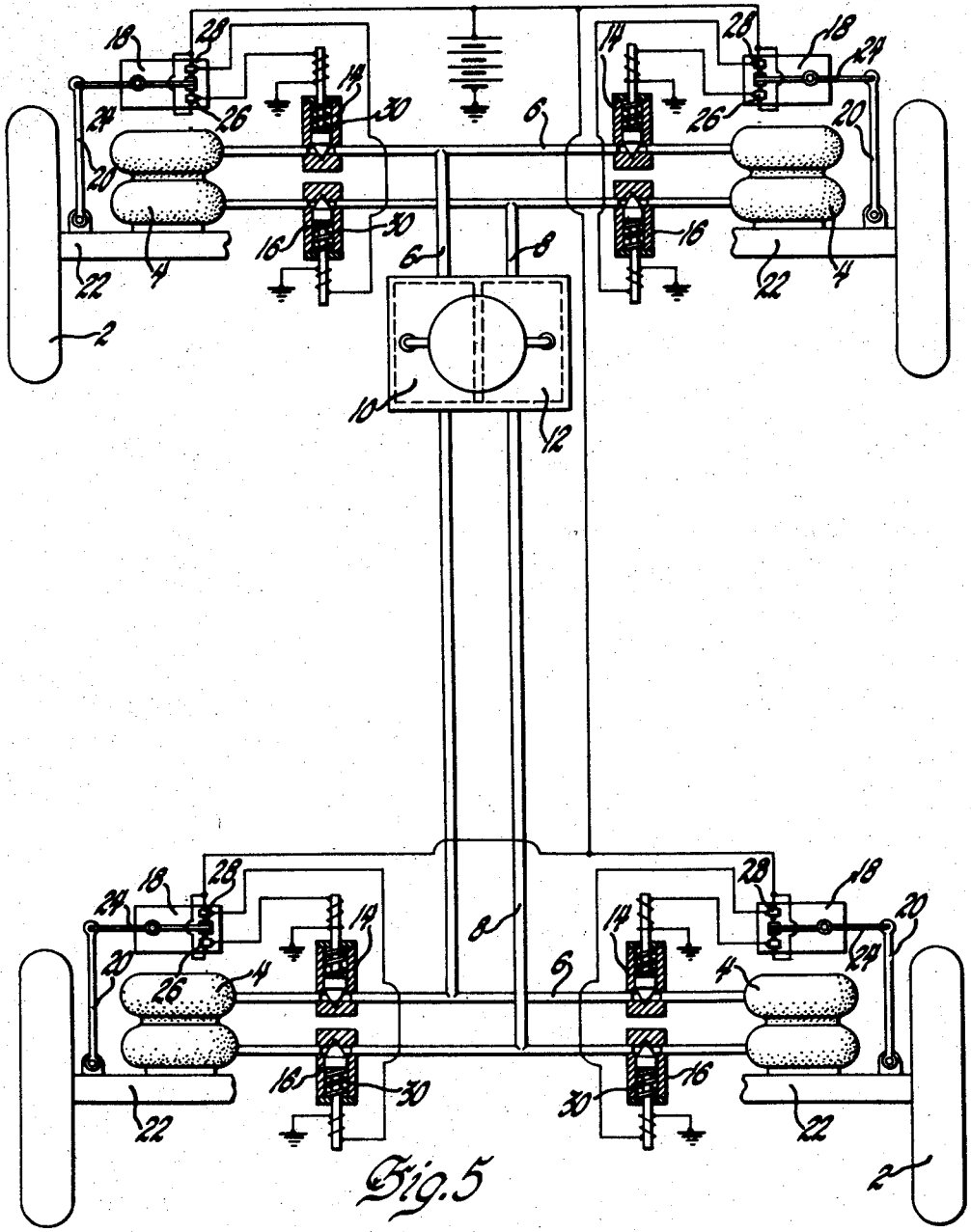
Fig. 5 is a diagrammatic view of an air suspension system incorporating the present invention.

Referring now to the drawings and particularly Fig. 5, there is shown schematically a vehicle suspension system utilizing air or other fluid as the elastic medium. As seen in the drawing, the suspended mass, not shown, is supported over each of the four wheels 2 by means of individual air springs 4. Inflation and deflation of springs 4 to regulate the trim height of the vehicle is accomplished by air intake lines 6 and exhaust lines 8 which respectively communicate with a high pressure source of air 10 and low pressure return tank 12. Movement of air from high pressure tank 10 to springs 4 is regulated by solenoid operated intake valves 14 located in the line 6 adjacent each of the springs, while return movement of air from springs 4 to low pressure tank 12 is regulated by solenoid operated exhaust valves 16 in lines 8. In order to control the position of valves 14 and 16 to regulate the flow of air in accordance with a predetermined trim height of the vehicle, a leveling valve control switch mechanism 18 is mounted on the sprung portion of the vehicle adjacent each of the wheels 4. Mechanism 18 is adapted to be operated by linkage 20 connected to the wheel supporting axle 22 so that upward displacement of the wheel causes the switch operating arm 24 to engage the intake valve control switch 26, while downward displacement of the wheel causes the arm to actuate the exhaust valve control switch 28. Switches 26 and 28, in turn, energized solenoid valves 14 and 16 which allow entrance or exit of air from the spring. It will, of course, be apparent that whenever the predetermined vehicle trim height is attained, switch controlling arm 24 will occupy a neutral position in which neither switch is actuated and hence both the intake and exhaust valves 14 and 16 will remain in the closed position under the influence of spring 30, thus preventing entrance or exit of air from the vehicle springs 4.

To prevent excessive movement of air through the system, it has been suggested in the past that the switch mechanism 18 include a damping structure adapted to cause a predetermined time delay or lag in the operation of switch actuating arm 24 following displacement of the wheel 4. However, in the past the lag so induced has affected movement of the arm 24 both from the normal neutral position to a switch actuating position and the return movement thereof to the neutral position.

According to the present invention, the leveling valve control mechanism 18 is so constructed and arranged that the damping action or time delay is effective only for movement of arm 24 away from its neutral position, while return thereof to neutral occurs at the same time rate as the displacement rate of the wheel.

As seen particularly in Figs. 1 and 2, leveling control mechanism 18 comprises generally a hollow body or housing 32 which is preferably affixed to the vehicle sprung mass. Extending transversely through housing 32 and supported in axially aligned bushings 34 and 36 is a shaft 38. Shaft 38 is maintained against axial movement in housing 32 by means of circular clips 40 and 42 which seat in grooves 44 and 46. Rigidly connected to shaft 38 interiorly of housing 32 is a driving member 48 having a bent end portion 50 extending generally parallel with the axis of shaft 38. Axially adjacent member 48, shaft 38 has rotatably supported thereon a driven member 24 having a downwardly depending paddle portion 54. Disposed over the midportion of shaft 38 between the side walls 56 and 58 of driven member 24 is a bushing 60 which is encircled by a double ended coil spring 62. The opposite extremities 64 and 68 of spring 62 claspingly engage the opposite side edges of the transverse midportions 50 and 70 of driving member 48 and driven member 24 so that rotation of shaft 8 in either direction will impart similar rotation to driven member 24 unless the latter is resisted by a force greater than the torsional windup of spring 62.

Mounted interiorly of housing 32 immediately below shaft 38 are a pair of micro switches 26 and 28 previously referred to. Each switch is provided with an operating plunger 72 and 74 which are aligned perpendicular to the normal plane of paddle 54 so that angular movement thereof in one direction causes actuation of micro switch 26 while movement in the opposite direction causes actuation of micro switch 28.

Spaced below switches 26 and 28 are a pair of identical pneumatic dashpot assemblies 76 and 78 which are arranged in opposed relation and retained in housing 32 by means of snap rings 80 and 82. Dashpots 76 and 78 are conventional diaphragm dashpots of the type shown in U.S. Patent No. 2,657,038 Emerson, assigned to General Motors Corporation, wherein movement of the plunger 84 or 86 in one direction is resisted by a pneumatic orifice while return movement under the influence of a spring caged in rubber boot 88 or 90 is unresisted and therefore occurs at a rate of movement similar to the rate of movement of paddle 54.

As will be evident from Fig. 2, the lower end of paddle 54 is simultaneously engaged by the displaceable plungers 84 and 86 of dashpots 76 and 78 when the paddle is in the normal vertically extending position. Therefore, angular movement of paddle 54 in either direction in response to rotary movement of shaft 38 in either direction from neutral is resisted by pneumatic damping effected by one or the other of the dashpots. However, sustained displacement of shaft 38 allows sufficient time for the paddle 54 to displace either plunger 84 or 86, as the case may be, sufficiently to actuate switch 26 or 28, respectively. Therefore, after elapse of the predetermined delay, either switch 26 or 28 will energize the electrical circuit to solenoid valve 16 or 14, causing actuation thereof to control the intake or exhaust of air from the associated spring 4. Hence, sustained displacement between the sprung and unsprung mass will allow sufficient time for response of the leveling mechanism and the subsequent introduction or exhausting of air from the spring will correct the deviation from a normal vehicle trim. However, it is to be especially noted that return angular movement of paddle 54 to the neutral position is not impeded by either dashpot 76 or 78 since the paddle moves away from the depressed plunger and does not engage the plunger of the other dashpot until fully returned to neutral. Because of the absence of delay in return movement of paddle 54 to the neutral position, overcontrol of air movement in and out of the suspension spring due to lag in recovery of the control switch is virtually eliminated.

In order that the invention may be more fully understood, there follows a description of the operation of the mechanism through a sequence of vehicle movements associated with entering a turn and subsequent return to a straight ahead path of movement. Assume that the vehicle (Fig. 5) is entering a sustained turn to the left from a straight ahead path and that the leveling mechanism under consideration is associated with one of the wheels at the outboard (right) side of the turn. Under these circumstances, the suspended portion of the vehicle tends to lean toward the outboard side of the turn thereby causing the outboard side to descend relative to the wheel. This relative displacement of the wheel and adjacent suspended portion causes the air spring to partially collapse due to additional weight imposed thereon. Simultaneously, the linkage connection 20 between the shaft 38 and the wheel supporting member 22 imparts counterclockwise rotation to shaft 38 which, in turn, tends to impart similar angular movement to paddle 54 through the medium of torsion spring 62. Since the outboard corner of the vehicle will remain depressed for a time duration in excess of the predetermined delay imposed by dashpot 78, the paddle 54 shortly moves to a position actuating micro switch 26 which, in turn, energizes the solenoid valve 14. Valve 14 thereupon opens the intake port permitting air to move through line 6 into spring 4 from tank 10 until the pressure in the increased spring raises the outboard corner of the vehicle to the normal trim height and simultaneously causes clockwise return movement of paddle 54 to the neutral position. It will be noted that return movement of the paddle 54 occurs at the same time rate as return movement of shaft 38, since the paddle is moving away from plunger 86 of dashpot 78 while the plunger 84 is completely out of engagement therewith.

The ability of the mechanism to center quickly greatly reduces overcontrol and hunting of the suspension system and is particularly important where vehicle operation involves a series of short duration turns alternating in direction. Under these conditions, it will be evident that the existence of even moderate delay in recovery of the control mechanism toward the neutral position from either angular position would result in continued operation of one or the other leveling valves for a period of time after the car attitude had changed such as to require operation of the opposite leveling valve. For example, if a short turn were made to the left followed quickly thereafter by a corresponding turn to the right, any delay in return of paddle 54 to neutral would cause the intake valve to remain open and continue to increase the pressure in the right spring even though the vehicle attitude had already changed so that opening of the exhaust valve was indicated. While such over correction would ultimately be overcome after the delay lapse, intervening dangerous unnatural vehicle attitude may occur. The present invention, however, largely eliminates both the unnecessary waste of air and the potential danger of overcontrol and continuous lag yet retains the desired damping characteristic which prevents operation of either leveling valve responsive to rapid short duration oscillation of the vehicle wheels and other momentary changes resulting from road irregularities and the like.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. In a vehicle suspension of the type including an expansible fluid spring interposed between each wheel and the adjacent sprung portion of the vehicle, a fluid intake line and a fluid exhaust line communicating with each spring, electrically operated intake and exhaust valves disposed in the respective lines, a control device for actuating said intake and exhaust valve, said device comprising a housing mounted on the sprung portion of the vehicle, a shaft rotatably disposed in sad housing, means connecting said shaft to said wheel in a manner whereby variation in displacement between said wheel and the adjacent sprung portion of the vehicle imparts rotary movement to said shaft, a driven member extending radially from and swingable on said shaft, a resilient torque transmitting device connecting said shaft and said driven member, a pair of switches disposed at opposite sides of said driven member, and a pair of unidirectionally active dampers one at either side of said member, each damper being effective to delay response of said driven member to rotary movement of said shaft from a neutral position in a direction approaching the switch at the corresponding side.

2. In a vehicle suspension of the type including an expansible fluid spring interposed between each wheel and the adjacent sprung portion of the vehicle, a fluid intake line and a fluid exhaust line communicating with each spring, electrically operated intake and exhaust valves disposed in the respective lines, a control device for actuating said intake and exhaust valve, said device comprising a housing mounted on the sprung portion of the vehicle, a shaft rotatably disposed in said housing, means connecting said shaft to said wheel in a manner whereby variation in displacement between said wheel and the adjacent sprung portion of the vehicle imparts rotary movement to said shaft, a driven member extending radially from and swingable on said shaft, a resilient torque transmitting device connecting said shaft and said driven member, a pair of switches disposed at opposite sides of said driven member, and a pair of pneumatic dashpots one at either side of said member, each dashpot being effective to delay response of said driven member to rotary movement of said shaft from a neutral position in a direction approaching the switch at the corresponding side.

3. In a vehicle suspension of the type including an expansible air spring interposed between each corner of the running gear and the adjacent sprung portion of the vehicle, an air intake line and an air exhaust line communicating with each spring, a solenoid operated intake valve and exhaust valve disposed in the respective lines, a control device for energizing said solenoid operated intake and exhaust valves, said device comprising a housing mounted on the sprung portion of the vehicle, a shaft rotatably disposed in said housing, means connecting said shaft to said running gear in a manner whereby variation in displacement between said running gear and the adjacent sprung portion of the vehicle imparts rotary movement to said shaft, a driven paddle member extending radially from and swingable on said shaft, a resilient torque transmitting device connecting said shaft and said driven member, a pair of solenoid energizing switches disposed respectively at opposite sides of said paddle, said switches being adapted for actuation by said paddle after predetermined angular movement thereof from a central neutral position, and a pair of pneumatic dashpots carried by said housing, each dashpot having a plunger member which is resiliently biased into abutting engagement with said paddle when the latter is in neutral position.

References Cited in the file of this patent

UNITED STATES PATENTS

| 2,405,015 | Carlson | July 30, 1946 |
| 2,670,201 | Rossman | Feb. 23, 1954 |
| 2,844,384 | Jackson | July 22, 1958 |

FOREIGN PATENTS

| H. 17,488 11/63C | Germany | Mar. 1, 1956 |
| 352,171 | Italy | Sept. 7, 1937 |